June 4, 1968   A. N. COOK ET AL   3,387,157
ELECTRIC MOTOR HOUSING IN CLUTCH-BRAKE DRIVING DEVICE
Filed May 10, 1965   3 Sheets-Sheet 1

WITNESS

INVENTORS
Albert N. Cook
James F. Turley

BY
ATTORNEY

June 4, 1968  A. N. COOK ET AL  3,387,157
ELECTRIC MOTOR HOUSING IN CLUTCH-BRAKE DRIVING DEVICE
Filed May 10, 1965  3 Sheets-Sheet 2
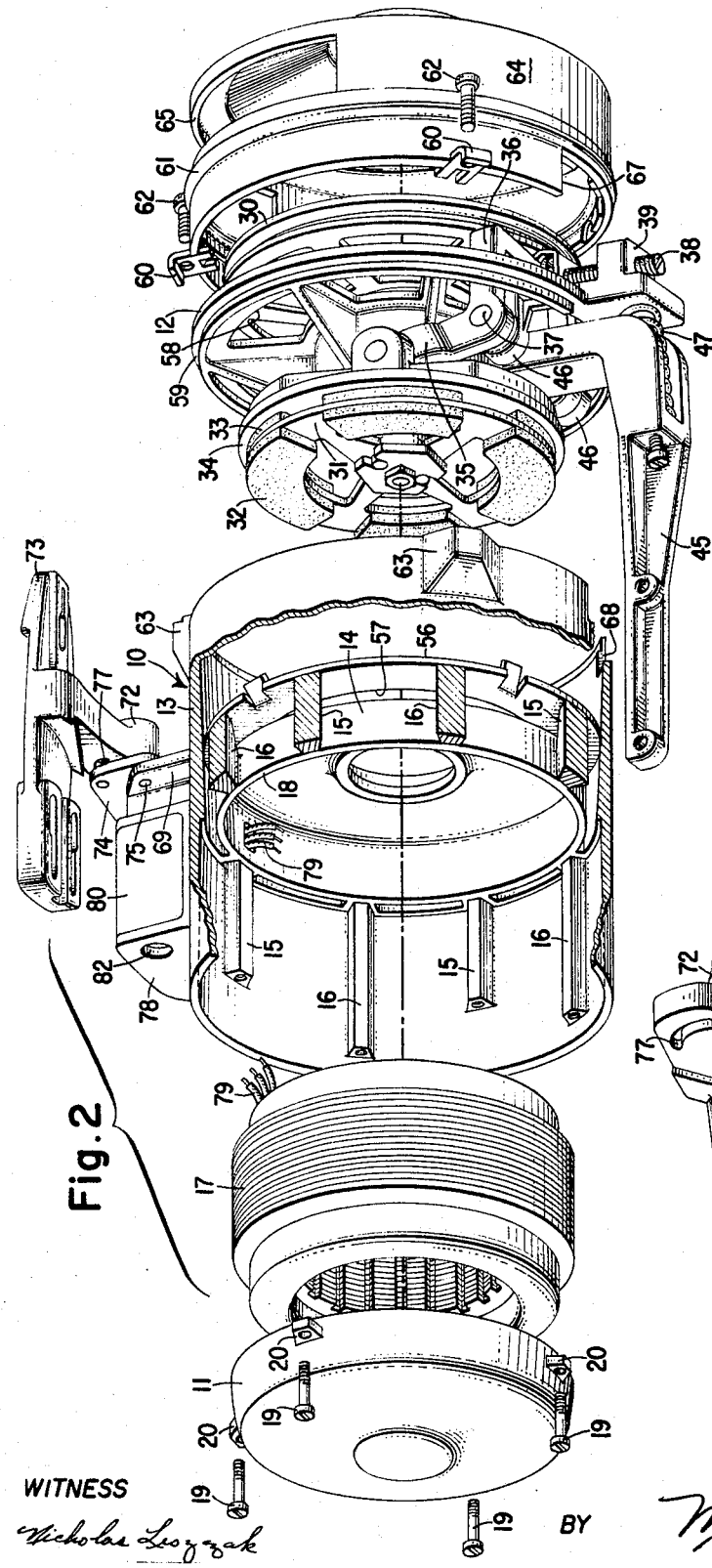
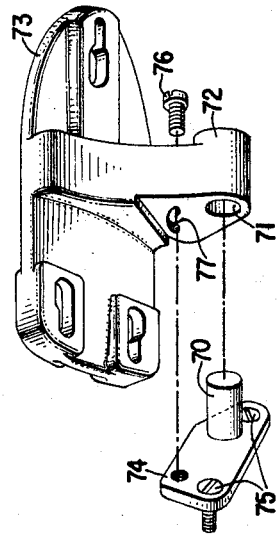
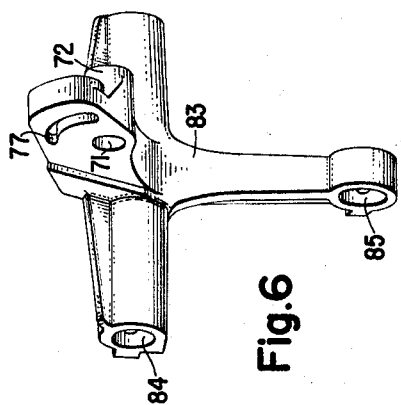
INVENTORS
Albert N. Cook
James F. Turley
BY
ATTORNEY
WITNESS

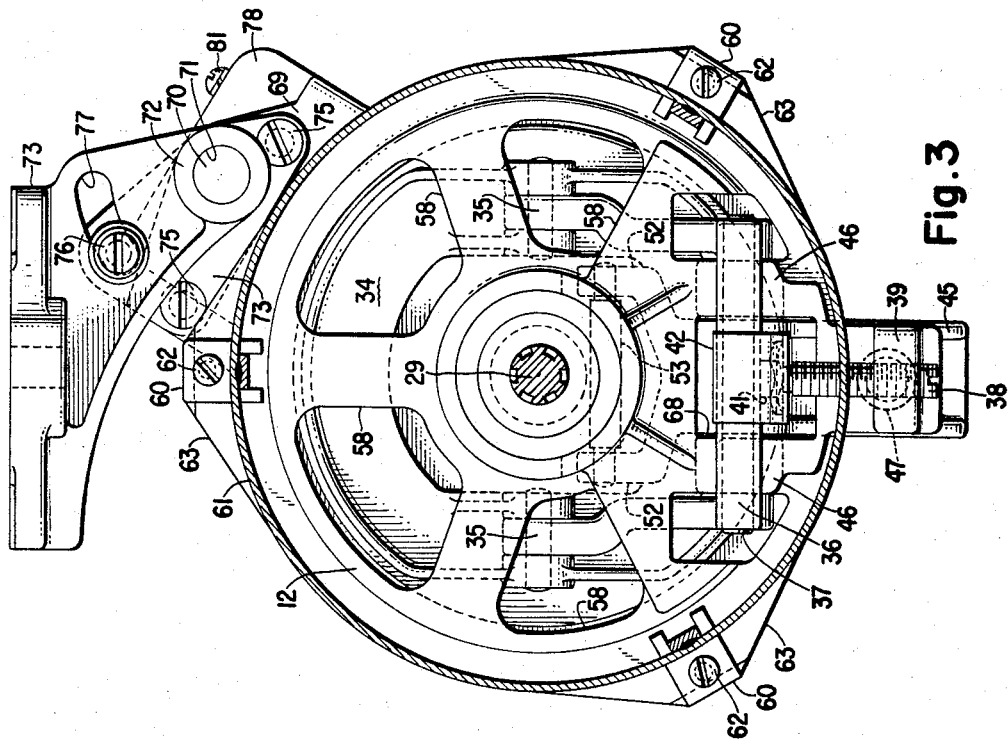

United States Patent Office 3,387,157
Patented June 4, 1968

3,387,157
ELECTRIC MOTOR HOUSING IN CLUTCH-BRAKE DRIVING DEVICE
Albert N. Cook, Madison, and James F. Turley, Cranford, N.J., assignors to The Singer Company, New York, N.Y., a corporation of New Jersey
Filed May 10, 1965, Ser. No. 454,409
2 Claims. (Cl. 310—258)

This invention relates to electric clutch-brake driving devices or transmitters and more especially to structure therefor which results in economies through simplification of parts and assembly while at the same time improving the ruggedness and functioning of the device for driving moderately heavy loads such as industrial sewing machines, which must be repeatedly started and stopped at frequent intervals.

An object of this invention is to provide a single integral housing structure for an electric clutch-brake motor which will accept, for assembly, stator cores of significantly different stack lengths without requiring any other changes except for a matching rotor assembly.

Another object of this invention is to provide a common pivotal axis for the clutch lever and for a bell-crank lever supporting the brake yoke.

A still further object of this invention is to provide improved clamping structure for the clutch-end closure whereby the clamps are held in a predetermined circumferentially-spaced relation by permanent securement to a rim member to which member the pulley guard is removably attached.

Other objects of this invention will be readily apparent when the following description is considered in connection with the accompanying drawings.

In the drawings:

FIG. 2 is an exploded view showing the parts of the device of FIG. 1 in disassembled perspective.

FIG. 3 is a right-hand end elevational view, partly in section taken on line 3—3 of FIG. 1.

FIG. 4 is a left-hand end elevational view of the device of FIG. 1.

FIG. 5 is a detailed perspective view showing means for mounting the device on the underside of a table.

FIG. 6 is a detailed perspective view of a bracket suitable for mounting the device on the tubular members of a table.

Figure 1:
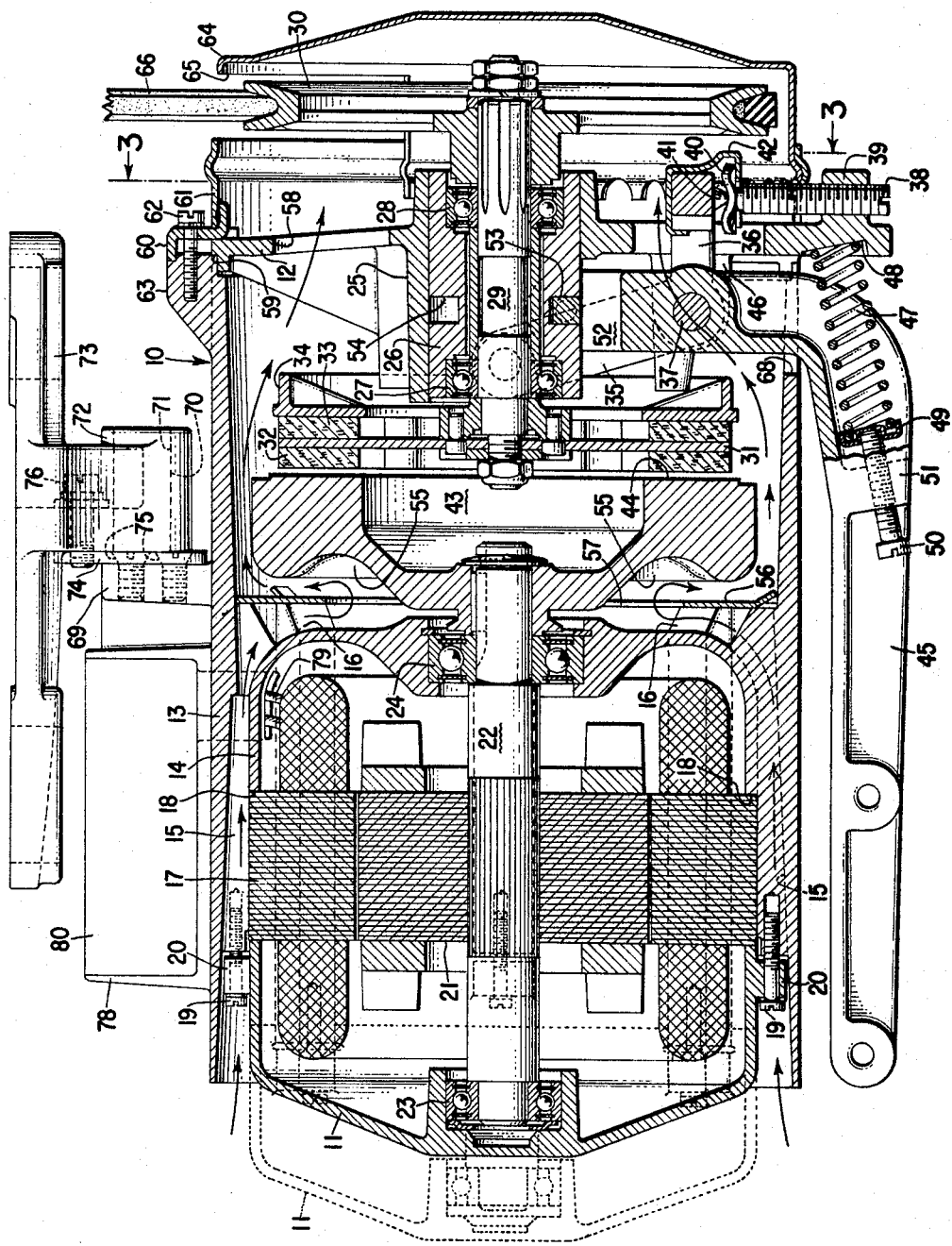
FIG. 1 is a longitudinal sectional view taken through a clutch-brake driving device illustrating an embodiment of this invention.

Referring more specifically to the drawings, a clutch-brake driving device or transmitter is shown having a casing made up of three parts; a main frame 10, an end closure 11 and a clutch-end closure 12. The main frame 10 is formed with an outer cylindrical wall portion 13 and an inner cup-shaped portion 14 radially spaced from and coaxial with said outer portion, and supported by circumferentially-spaced ribs 15 and 16 integrally formed with both portions. Alternate shorter and longer ones of said ribs 15, 16 extend to different distances axially beyond one end of said cup-shaped portion 14 to define a structure for selectively seating stator cores of significantly different stack lengths as will be described.

As shown in FIG. 1, a stator core 17 is coaxially guided by the ribs 15 and 16 to a seated position against an annular rib 18 formed by the end of the cup-shaped portion 14 and is held clamped in this position by the end closure 11 by taking up on screws 19 which pass through lugs 20 and are tapped into the ribs 15. This structure will also accept a stator core of greater stack length using the same end closure 11. In this latter case, the longer stator core is seated as before to bottom against the annular rib 18 but the end closure 11 is rotated from its former position so that the screws 19 are now tapped into the longer ribs 16, the end closure 11 being positioned in clamping relation to the longer stator core as shown in the dotted lines of FIG. 1.

A rotor core 21 is secured to a rotor shaft 22 journaled at one end in a bearing 23 supported by the end closure 11, and journaled at the other end in a bearing 24 supported by the cup-shaped portion 14. To match the longer stattor core, a different rotor core and shaft assembly will of course be required, but all other parts remain the same. With the above structure, the inventory of parts necessary to assemble different lines of clutch-brake transmitters having significantly different ratings with respect to speed and/or horsepower is greatly reduced and results in substantial cost savings due to the fact that most of the parts are completely interchangeable.

The clutch-end closure 12 is formed with a central tubular support 25 which rotatably and slidably carries a control sleeve 26. Two spaced ball bearings 27 and 28 are fitted into bores in opposite ends of the sleeve 26 and carry a driven shaft 29 which is rotatable relative to the sleeve 26 and slidable with the sleeve. The outer end of the driven shaft 29 carries a driven pulley assembly 30. A clutch disc 31 carrying friction facings 32 and 33 on either side is fastened to the inner end of the driven shaft 29. A brake ring or yoke 34 is pivotally mounted on the arms 35—35 (FIG. 3) of a bell-crank lever 36 which itself pivots about a pin 37 secured to the end closure 12. The position of the bell-crank lever 36 is adjusted by a screw 38 threaded into a boss 39 formed on the end closure 12. The screw 38 is formed on one end with a cam 40 having a periodically rising and falling surface against which a follower 41 is forced to ride. The follower 41 is formed on the end of the bell-crank lever 36 and is held resiliently captive against the surface of cam 40 by means of a clamping spring 42 as shown in FIG. 1.

It will be seen that, by taking up on the adjusting screw 38, the bell-crank lever 36 is rotated counter-clockwise as viewed in FIG. 1 by discrete angular amounts due to the cam 40 and follower 41 connection. This action moves the brake yoke 34 to the left in discrete amounts as viewed in FIG. 1, to provide a positive but minimum spacing between the clutch facing 33 and the brake yoke 34. This brake adjusting structure is similar in function to that shown and described in the United States Patent No. 2,735,524, to which reference may be made for a complete understanding of this adjustment. The present structure, however, results in a position for the adjusting screw 38 which is more conveniently accessible than formerly.

A cup-shaped imperforate flywheel 43 is fastened to the rotor shaft 22 and is provided with a clutch surface 44 selectively engageable by the friction facing 32. An L-shaped clutch and brake actuating lever 45 is pivotally carried by the pin 37 which is supported in two bosses 46—46 formed on the end closure 12. A brake compression spring 47 seated in a depression 48 formed in the boss 39 is received in a thrust cup 49 mounted on the end of an adjusting screw 50 threaded into a boss 51 formed on the actuating lever 45, as shown in FIG. 1. The spring 47 urges the lever 45 in a clockwise direction about pin 37 as viewed in FIG. 1. The arms 52—52 (best seen in FIG. 3) are formed on one end of the lever 45 and carry a pin 53 which extends between them. The pin 53 passes below the driven shaft 29 through a circumferential groove 54 formed in the slidable sleeve 26 as clearly seen in FIG. 1. Motion of the lever 45 about the pivot pin 37 moves the sleeve 26 and therefore the driven shaft 29 axially in the end closure 12 to selectively engage the clutch disc 31 in driving relation with the flywheel 43 or in stopping relation with the brake ring 34.

In order to circulate cooling air through the device, a series of radial fan blades 55 are formed on the flywheel 43. An annular baffle ring 56 pressed into the housing 10 and seated against the ends of the ribs 15 and 16 is provided with a central opening 57. Ventilating air enters the annular space between the end closure 11 and the housing wall 13, and is guided axially by the passages formed between the spaced ribs 15 and 16 as shown by the arrows in FIG. 1 and is caused by the baffle 56 to be directed toward the fan blades 55 at the inner diameter thereof. The centrifugal action of the blades on the air causes it to flow radially outwardly shown by the arrows and around the flywheel 43 within the housing wall 13 to be discharged through outlet apertures 58 made in the clutch-end closure 12. The direct and intimate contact of the ventilating air with the laminations of the stator core 17 provides excellent cooling of the motor which is of the totally enclosed variety. The large mass of the flywheel 43 and the direct flow of air over it provide a combination for the absorption and dissipation of heat incident to clutch friction which prevents over heating of the clutch parts even under the severe duty of frequent starts and stops.

The clutch-end closure 12 is formed with a circumferential rabbeted fit into the end of the housing 10 as shown at 59 in FIG. 1. Clamps 60 secured to a rim member 61 in equally-spaced circumferential relation are removably secured to the housing 10 by means of screws 62 threaded into bosses 63 formed on the housing. It will be seen that, by removing the screws 62, the clamp-and-rim structure 60, 61 can be removed as a unit and the end closure with all the clutch and brake assembly may be withdrawn as a unit from the housing 10 for inspection, repair or replacement as clearly seen in FIG. 2. Further, this construction permits freedom of angular adjustment of the end closure 12 relative to the housing 10 such that the actuating lever 45 may be positioned for the best pull regardless of changes in angular position of the housing 10 occasioned by customary belt tightening adjustments.

A pulley cover 64 is frictionally secured to the rim member 61 and has a cut-out portion 65 to permit passage of a belt 66. The rim member 61 also has a cut-out portion 67 to permit the necessary parts of the clutch mechanism to pass through and with sufficient clearance to allow the relative angular rotation to permit the adjustment referred to above. A cut-out portion 68 in the housing 10 is similarly provided for passage of the lever 45.

A boss 69 is formed on the exterior of the housing 10 (FIG. 1). A steel wear-plate 74 is secured to the boss 69 by means of screws 75. The wear-plate 74 (FIG. 5) is formed with a pivot pin 70 which engages an aperture 71 formed in a boss 72 of the mounting bracket 73 which is adapted to be secured for support to the underside of a table. Adjustment of the housing 10 angularly about the pivot pin 70 for belt tightening is made by manipulation of a screw 76 which passes through a sector cut-out 77 in the boss 72 and is threaded into the wear-plate 74 as clearly seen in FIG. 5.

A terminal box 78 is formed on the exterior of housing 10 and contains terminals (not shown) to which motor leads 79 are connected. A cover 80 is secured by a screw 81 (FIG. 4) and an aperture 82 in the box 78 provides access means for connection to external circuits.

Where it is desired to mount the clutch-brake driving device on the horizontal tubular members of a table, an alternative mounting bracket 83 of the form shown in FIG. 6 may be used instead of the bracket 73. The bracket 83 contains apertures 84 and 85 for receiving the tubular members of the table and the parts having interchangeable function with those of the bracket 73 are numbered accordingly.

From the above description it will be apparent that there is provided according to this invention a clutch-brake driving device having the following features:

(1) A single housing structure that will accept, without modification, motor structure having significantly different stacking lengths to accommodate different horsepower and/or speed ratings, thus simplifying the inventory of parts.

(2) Simplification of assembly by providing a bell-crank lever for the brake yoke which has a common pivot with the clutch actuating lever.

(3) Clutch-end closure which carries clutch-brake mechanism and is adjustable angularly with respect to housing for the best pull position of the actuating lever.

(4) Clutch-end closure which is removably clamped to the housing by clamps held in predetermined circumferentially spaced relation by an integral rim which supports a removable belt guard.

Having thus set forth the nature of the invention what is claimed is:

1. Integral housing structure for a clutch-brake driving device having an electric driving motor, comprising a frame having a cylindrical outer wall portion, an inner cup-shaped portion radially spaced from and coaxial with said outer portion, circumferentially-spaced ribs integral with and joining both portions, alternate ones of said ribs extending to different distances axially beyond the open end of said cup portion to define a structure for seating electric motor stator cores of substantially different stack lengths.

2. Apparatus according to claim 1 including a single end closure having circumferentially-spaced lugs which positionally cooperate with alternate ones of said ribs by selective rotation of said end closure to clamp a selected one of said stator cores in said housing.

No references cited.

MILTON O. HIRSHFIELD, *Primary Examiner.*

R. W. TEMPLETON, *Assistant Examiner.*